Figure 3:
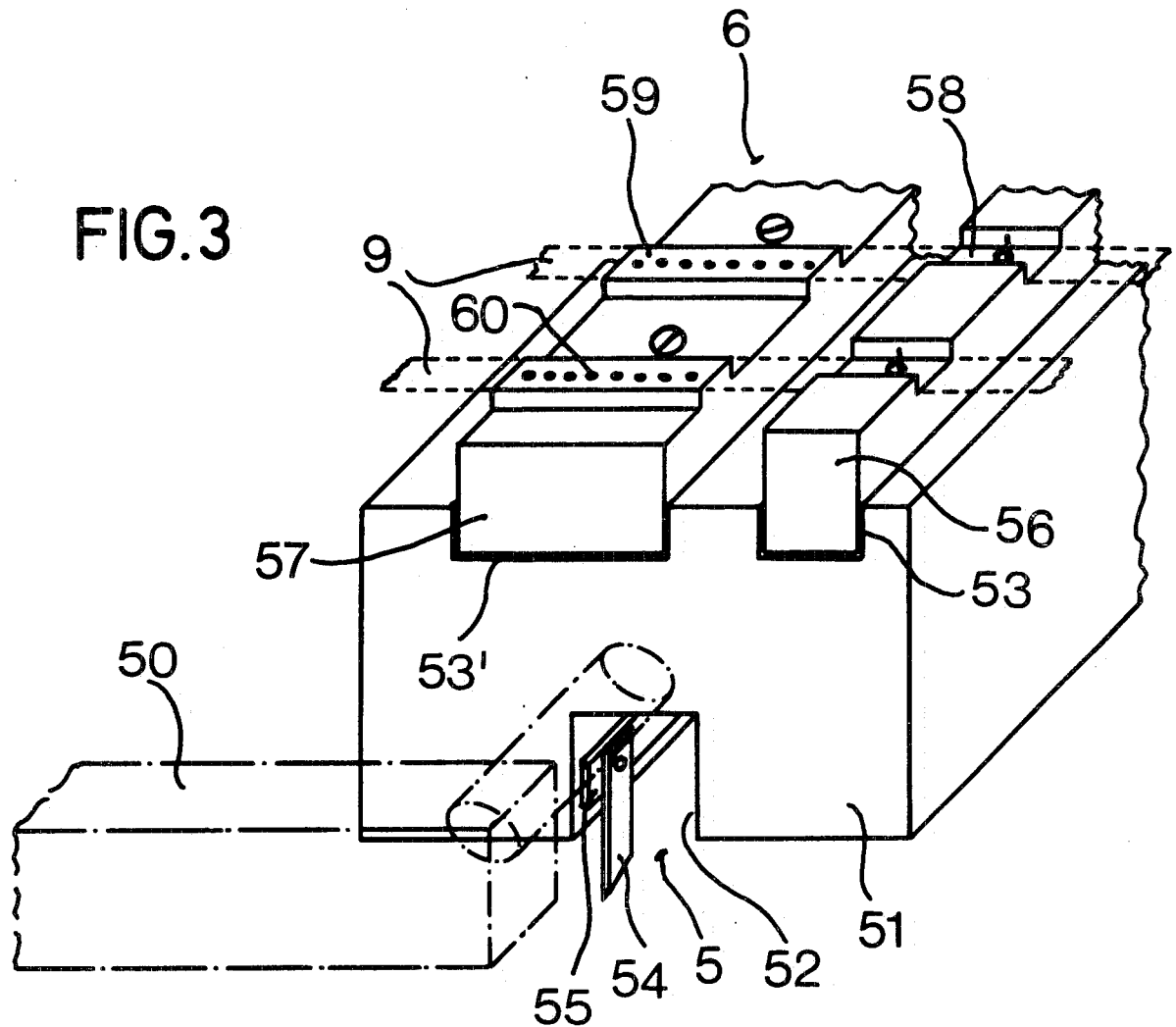

United States Patent [19]

Schoettle et al.

[11] 4,175,999

[45] Nov. 27, 1979

[54] APPARATUS FOR LOADING MAGNETIC TAPE CASSETTES WITH MAGNETIC TAPE

[75] Inventors: Klaus Schoettle, Heidelberg; Peter Dobler, Ludwigshafen; Lothar Gliniorz, Frankenthal; Volker Scherer, Willstaett; Heinz Brombach, Oberkirch-Stadelhofen, all of Fed. Rep. of Germany

[73] Assignee: BASF Aktiengesellschaft, Fed. Rep. of Germany

[21] Appl. No.: 839,660

[22] Filed: Oct. 5, 1977

[30] Foreign Application Priority Data

Nov. 4, 1976 [DE] Fed. Rep. of Germany ....... 2650457

[51] Int. Cl.² .................. B31F 5/06; B65H 69/06
[52] U.S. Cl. .................. 156/505; 156/304; 156/507; 156/510; 242/56.6; 242/56.9
[58] Field of Search ............ 156/502, 505, 506, 507, 156/497, 518, 157, 159, 259, 528, 530, 304, 510; 242/56 R, 56.2, 56.4, 56.5, 56.6, 56.9

[56] References Cited

U.S. PATENT DOCUMENTS

| 2,698,359 | 12/1954 | Roberts | 242/56.4 |
| 3,554,842 | 1/1971 | Byrt | 156/505 |
| 3,753,835 | 8/1973 | King | 156/506 |
| 3,787,270 | 1/1974 | King | 156/506 |
| 3,825,461 | 7/1974 | Gorman | 242/56 R |

Primary Examiner—Michael G. Wityshyn
Attorney, Agent, or Firm—Keil & Witherspoon

[57] ABSTRACT

Apparatus for the simultaneous loading of a plurality of otherwise finished magnetic tape cassettes, provided with leader tape, with magnetic tape, comprising a device for cutting a web of base film, provided with a magnetic coating, into a plurality of magnetic tapes; a downstream splicing station for joining the magnetic tapes to the leader tapes; a holder for the magnetic tape cassettes; and a device for winding the tapes into the cassettes.

4 Claims, 4 Drawing Figures

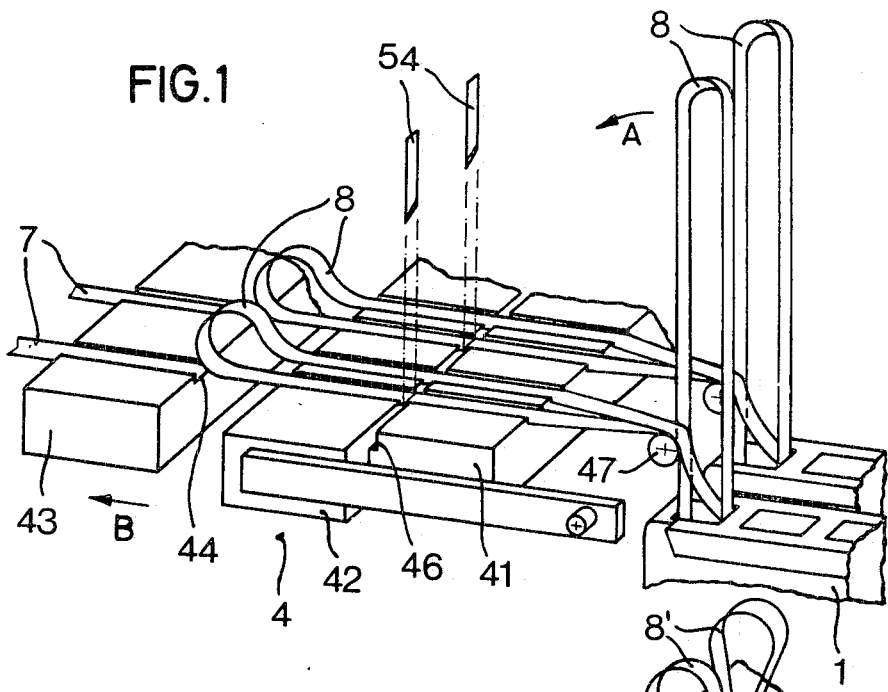
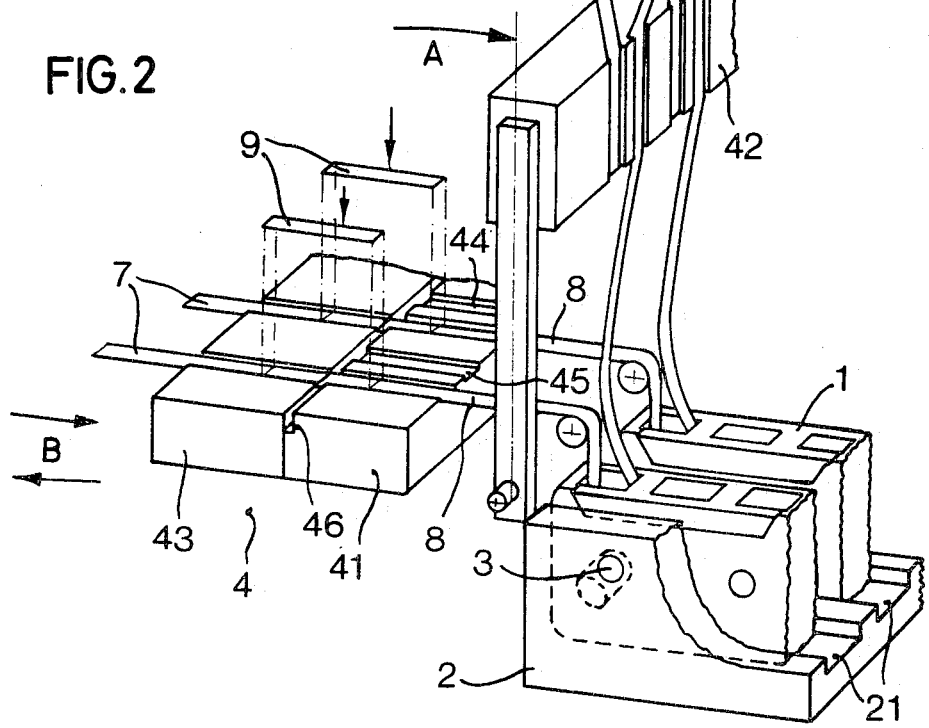

APPARATUS FOR LOADING MAGNETIC TAPE CASSETTES WITH MAGNETIC TAPE

The present invention relates to a device for the simultaneous loading of a plurality of otherwise finished magnetic tape cassettes, provided with leader tape, with magnetic tape.

Processes in which empty cassettes are first produced have been disclosed for the production of, for example, compact cassettes. Such empty cassettes, which are referred to, in the case of compact cassettes, as "CO cassettes", contain, except for the magnetic tape, all the components of the cassette, including the hubs, to each of which is fixed one end of a leader. In a further stage of manufacture, the magnetic tape is spliced to the two leeaders and wound into the CO cassette.

Mechanical apparatus for loading such CO cassettes with magnetic tape are known. However, they are only capable of filling one cassette at a time with magnetic tape from a supply reel: after the coated web of base film has been cut into discrete magnetic tapes, the tapes must first be wound onto hubs or spools in order to produce the supply reels, usually referred to as pancakes. It is a further disadvantage that the knife used to sever the magnetic tape usually approaches it from the side, as a result of which stretching of the tape on the side first contacted by the knife can easily occur and irregular cuts may be readily produced.

An object of the invention is to provide an apparatus which overcomes these disadvantages of the prior art apparatus. A further object of the invention is to provide an apparatus with which a plurality of cassettes can be simultaneously loaded with magnetic tape, and which can be manufactured at lower cost than prior art apparatus.

These objects are achieved according to the invention by an apparatus which comprises
- a holder for magnetic tape cassettes to be arranged next to one another;
- a drive with a splined shaft which can be inserted into the hubs of the magnetic tape cassettes, and withdrawn therefrom;
- means for simultaneously severing all the tapes and simultaneously dispensing and pressing strips of splicing tape onto the ends of tape to be joined, which means are located in a frame and can be moved at right angles to the surfaces of the magnetic tapes;
- a splicing station for simultaneously joining together all the magnetic tapes allocated to the magnetic tape cassettes, and the leaders, which station is associated with said cutting means and said splicing tape dispensing and applicator means and is arranged between said holder and guide means for the magnetic tapes; and
- a device for cutting a web of base film, provided with a magnetic coating, into a plurality of magnetic tapes, which device is arranged upstream of said guide means.

In a further embodiment of the invention, the means for severing the tapes and dispensing and pressing strips of splicing tape onto the tape ends to be joined comprise a holder block which is rotatably mounted in the frame and has, on one of its longitudinal sides, a bar with knives having slanting cutting edges, and, on a second longitudinal side, means for receiving a dispenser for strips of splicing tape and for receiving means for applying the strips of splicing tape.

In yet another embodiment of the invention, the station for splicing the magnetic tapes to the leaders comprises a first stationary holder bar, a second holder bar which can be moved out of the plane in which the stationary holder bar is located, and a third holder bar which is displaceable relative to said first holder bar, the holder bars consisting of rectangular members whose upper surfaces are provided with grooves of such a width and arranged in such a way that the leader tapes and magnetic tapes can be accommodated therein, the bottom surfaces of the grooves being provided with openings which can be connected to a source of vacuum.

The apparatus according to the invention makes possible the economic loading of magnetic tape cassettes with magnetic tape and avoids the costs hitherto entailed in the production of the supply reels. With the apparatus of the invention it is possible to coordinate winding of the magnetic tapes into the cassettes with the operation of the device for cutting the web of coated base film. Although the apparatus is primarily intended for loading magnetic tape cassettes with magnetic tape, it can also be used to process other materials in tape form, for example to wind film into film cassettes. In this case the parts of the apparatus cooperating with the material to be processed merely have to be adapted to suit this material.

Figure 4:
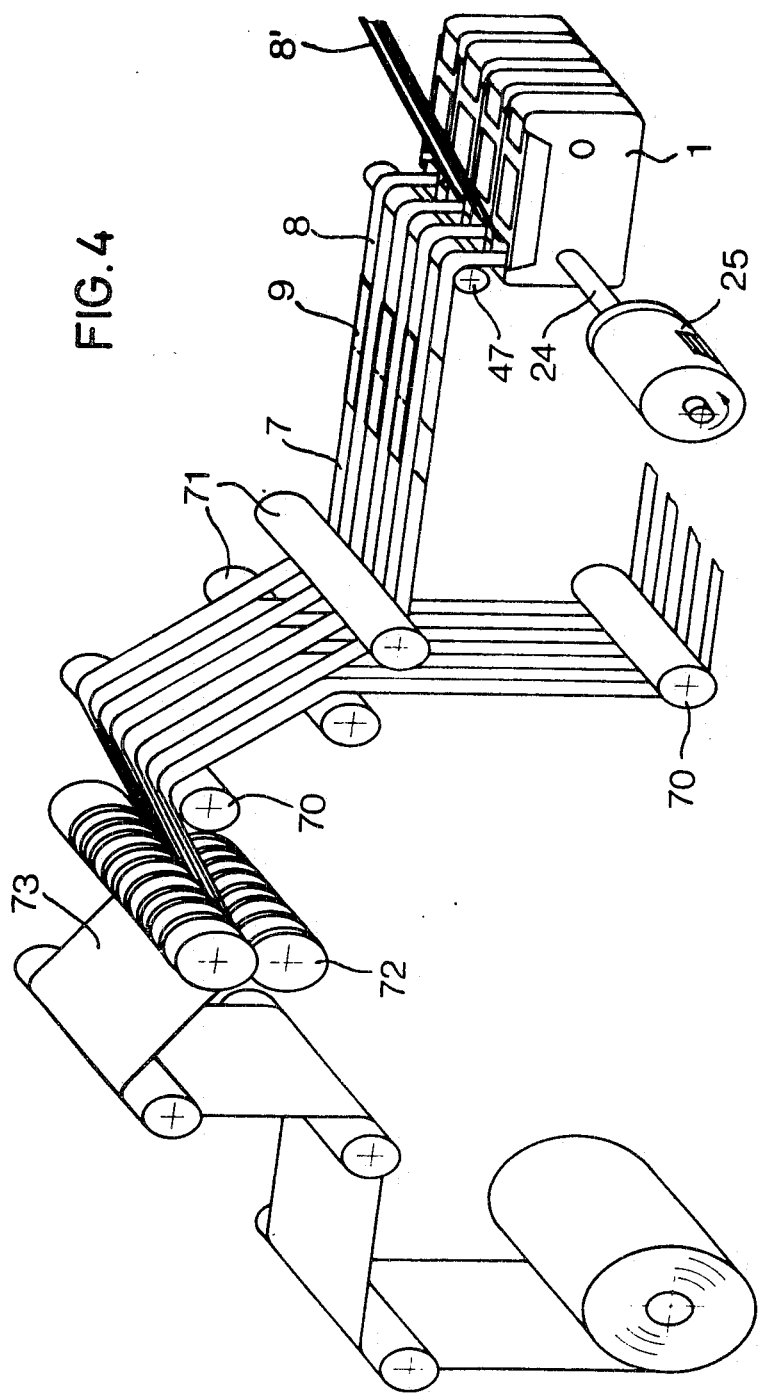

Further details of the invention are disclosed in the following description of one embodiment of the apparatus illustrated in the accompanying drawings, in which FIGS. 1 and 2 are schematic views of the apparatus of the invention in two different operating positions, FIG. 3 is a schematic view of the means for severing the tapes and applying the strips of splicing tape, and FIG. 4 shows schematically the operating procedure.

The apparatus for loading, for example, CO compact cassettes 1 (hereinafter referred to as "cassettes") consists, as FIGS. 1 and 2 show, essentially of a holder 2 for the cassettes 1, the drive for one hub 3 in each cassette, and the splicing station 4 with actuatable devices 5 and 6 (cf. FIG. 3) for severing the leaders 8 and 8' and magnetic tapes 7, and for dispensing and pressing strips of splicing tape 9 onto the tape ends to be joined.

The holder 2 for the cassettes 1 is a member preferably made of plastics material or aluminum which is provided with a plurality of depressions 21 in which the cassettes 1 are inserted. The depressions 21 are so dimensioned that the cassettes 1 are held immobile therein. The number of depressions and their arrangement are matched to the number of tapes provided by the cutting device and the manner in which the tapes are guided. It is advantageous to fix the cassettes 1 inserted in the depressions by means of a rod which passes through openings in the cassettes and corresponding holes in the side walls of the holder 2.

For rotating the hubs 3 on which the magnetic tapes 7 are to be wound there is provided a motor-driven shaft 24 (cf. FIG. 4) which is provided with freewheels and can be introduced into the toothed central openings in the hubs 3. For this purpose the drive 25 with the shaft is displaceably mounted.

FIGS. 1 and 2 show a preferred embodiment of the splicing station which comprises a first stationary holder bar 41, a second holder bar 42 which can be pivoted in the directions indicated by the double arrow A, and a third holder bar 43 which can be displaced in the directions indicated by double arrow B. As shown in FIG. 1, all three holder bars 41, 42 and 43 in their initial positions lie in one plane. The upper surfaces of the holder bars, consisting of rectangular members, are provided with grooves for guiding and holding the leaders 8, 8' and the magnetic tapes 7, which grooves are aligned with one another. The bases of the grooves 44, which bases serve as tape supports 45, are provided with apertures that are connected to a source of vacuum; the leaders 8, 8' and magnetic tapes 7 inserted in the grooves 44 are thus held in place by suction. The applied vacuum can be turned off by means of actuatable valves, thus releasing the tapes 7, 8 and 8'. The holder bars 41, 42 and 43 are preferably made of metal, particularly steel.

The device 5 for severing the tapes 7, 8 and 8' and the device 6 for dispensing and applying the strips of splicing tape 9 are arranged in a pivotable frame 50 above the holder bars 41, 42 and 43 (cf. FIG. 3). A rectangular holder block 51, which can be rotated about its longitudinal axis in frame 50 and can be moved together with the latter at right angles to the upper surfaces of the magnetic tapes, is provided with longitudinal grooves 52, 53 and 53' in its upper and lower surfaces for accommodating devices 5 and 6. A bar 55 provided with knives 54 for severing the tapes 7, 8 and 8' is fastened by means of screws in the longitudinal groove 52 in the lower surface of the holder block 51. The knives 54, which are located above the grooves 44 in the stationary holder bar 41 which accommodate the tapes to be severed, and are at right angles to the said grooves, have slanting cutting edges. The rear upper edge 46 of the holder bar 41 is stepped to prevent the cutting edges of knives 54 from coming into contact with the holder bar during the cutting operation.

The upper surface of holder block 51 is provided with a longitudinal groove 53 for accommodating dispenser 56 for the strips of splicing tape 9, and with a longitudinal groove 53' for securing an applicator 57 which preferably has a structured resilient surface. For detachably fixing the dispenser 56, in whose transverse grooves 58 the strips of splicing tape 9 are held by means of pointed pins, the longitudinal groove 53 and the dispenser 56 are provided with conventional actuatable mechanical locking means which cooperate with one another, e.g. in the form of undercuts in conjunction with movable spring-loaded projections, or spring-loaded latching means. Detachable magnetic connections may for example also be used for securing the dispenser 56 in the longitudinal groove 53. The means of securing the dispenser 56 do not form part of the present invention and are therefore not shown in the drawings.

The base of the longitudinal groove 53 is provided with spring elements, so that, as will be explained later, when the strips of splicing tape are pressed, by means of applicator 57, onto the ends of tape to be joined, the dispenser 56 can retract with respect to the applicator 57.

The applicator 57 is a rectangular member which is secured in the longitudinal groove 53' by means of screws and whose upper surface is provided, by machining, with bars 59 of the same width as the transverse grooves 58 of the dispenser 56, the bars 59 being aligned with the grooves 58. The bars 59 have apertures 60 which are connected to a source of vacuum and a source of pressure via a hose and an actuatable valve, so that the strips of splicing tape 9 held in the transverse grooves 58 of the dispenser 56 are initially held against the upper surfaces of the bars 59 by suction.

The devices 5 and 6, borne by the holder block 51, are actuated via frame 50 by a cylinder (not shown in the drawings). The holder block 51 can be turned through an angle of 180° by hand or by means of a cylinder.

As already stated, the above-described apparatus for loading the CO cassettes with magnetic tapes cooperates with the device for cutting the web of coated base film 73 (cf. FIG. 4). To this end there are provided, between the said apparatus and the cutting device 72, rolls 70 and 71 for guiding the magnetic tapes 7 and conventional means (not shown in the drawings), such as dancer rolls, which serve to balance out fluctuations in speed and tension. The rollers 71 serve to guide alternate magnetic tapes 7 into two working planes, to each of which is allocated an apparatus according to the invention for loading CO cassettes. The paths along which the magnetic tapes 7 are guided in the apparatus for loading the cassettes is determined by the arrangement of the CO cassettes.

The operating procedure (cf. FIG. 4) of the apparatus of the invention commences with the insertion of the cassettes 1 in the holder 2. All the leader tapes which have previously been pulled out of the cassettes 1 by means of a grooved auxiliary member, e.g. a circular rod provided with grooves, to form loops are then simultaneously inserted in the grooves 44 of the stationary holder bar 41 and the pivotable holder bar 42 (cf. FIG. 1) in such a way that for each cassette two parallel lengths of leader 8, 8', lying next to each other, are formed. After the leader tapes, held firmly in the grooves 44 by suction, have been cut into the leaders 8, 8' by the knives 54 which are rapidly moved downwards and upwards again together with the frame 50, which is actuated by a cylinder, the holder bar 42 bearing the leaders 8' is pivoted upwards in the direction indicated by double arrow A (cf. FIG. 2) and the holder bar 43 with the magnetic tapes 7, which have been inserted in the grooves 44 after insertion of the cassettes in the holder 2, is pushed up against the stationary holder bar 41. By turning the holder block 51 in the frame 50 through an angle of 180°, the dispenser 56 with the strips of splicing tape and the applicator 57 are moved into position above the ends of leaders 8 and magnetic tapes 7 to be spliced together, which leaders and magnetic tapes are held in place by the vacuum applied to the tape supports 45. As a result of actuation of the cylinder for the frame 50, the holder block 51 is moved downwards onto the holder bars 41 and 43 to press the strips of splicing tape 9 onto the ends of tapes 7, 8 to be joined, with the aid of applicator 57. The dispenser 56 which comes into contact with the upper surface of holder bar 43 is urged back into the longitudinal groove 53 of the holder block 51 against the force of the spring elements, so that, as the holder block 51 continues downwards, the strips of splicing tape are detached from the transverse grooves 58 of the dispenser 56 by the bars 59 of applicator 57. At this point in time when the strips of splicing tape are applied to the ends of tapes 7 and 8 to be joined, by means of applicator 57, the apertures 60 in bars 59 are, by means of a valve, disconnected from the source of vacuum and connected to a source of pressure to detach the strips of splicing tape 9 from the applicator 57. While the frame 50 with holder block 51 is being subsequently moved in the opposite direction back to its original position by actuation of the cylinder, the vacuum applied to the grooves 44 of holder bars 41 and 43 is turned off to release the magnetic tapes 7 and leaders 8, and the drive 25 with shaft 24 is activated, so that the desired lengths of magnetic tape are wound onto the hubs 3 of cassettes 1. At the same time the cutting device 72 is brought into operation, so that the magnetic tapes 7 are wound into the cassettes 1 at the speed at which the web of coated base film 73 runs through the cutting device. To ensure accurate guidance of the magnetic tapes 7 into the narrow openings in the front walls of the cassettes 1, tape guide members 47 are arranged above and in close proximity to these openings.

After the tape winding operation is over and the drive 25 has been stopped, the cylinder of frame 50 is activated again to sever the magnetic tapes 7 after vacuum has first been reapplied to the grooves 44 in holder bars 41 and 43 and the holder block 51 in frame 50 has been turned through an angle of 180°. Before holder bar 42 with leaders 8' is pivoted back again into the plane of the stationary holder bar 41, holder bar 43 is pushed back into its original position. The ends of magnetic tapes 7 and leaders 8' which now abut one another are then spliced together in the same manner as described above, the empty dispenser 56 having been previously replaced by a new dispenser 56 provided with strips of splicing tape 9. Then drive 25 is again activated briefly to draw the trailing ends of the magnetic tapes 7, with the leaders 8', fully into the cassettes 1. This concludes the process of loading the cassettes 1, so that they can be removed from the holder 2 and new empty, i.e. pre-leadered, cassettes can be inserted in the holder.

The apparatus shown in the drawings employs two banks of cassettes, but the magnetic tapes can diverge from the cutting device to a single bank of cassettes or more than two banks can be used. To have the tapes approach the or each bank in a common working plane is convenient for the splicing operations but also is not essential.

We claim:

1. Apparatus for the simultaneous loading with magnetic tape of a plurality of otherwise finished magnetic tape cassettes provided with leader tape, comprising:
   (a) a device for cutting a web of base film provided with a magnetic coating longitudinally into a plurality of magnetic tapes;
   (b) means for guiding each of said tapes from said web cutting device downstream to the remainder of said apparatus;
   (c) a holder for magnetic tape cassettes to be arranged one next to another;
   (d) a drive with a splined shaft which can be inserted into the hubs of said magnetic tape cassettes and withdrawn therefrom;
   (e) means for simultaneously transversely severing each of said magnetic tapes and simultaneously dispensing and pressing strips of splicing tape onto the ends of said magnetic tapes produced by said severing, which severing and splicing tape dispensing and pressing means are located on a frame and can be moved at right angles to the surfaces of said magnetic tapes; and
   (f) a splicing station for simultaneously joining said severed magnetic tape ends provided with splicing tape to corresponding leaders of said magnetic tape cassettes, which station is associated with said severing and splicing tape dispensing and pressing means and is arranged between said holder and said guide means.

2. Apparatus as claimed in claim 1, wherein the means for severing the tapes and dispensing and pressing strips of splicing tape onto said severed magnetic tape ends comprises a holder block which is rotatably mounted in the frame and has, on one of its longitudinal sides, a bar with knives, and, on a second longitudinal side, means for receiving a dispenser for strips of splicing tape and for receiving means for applying the strips of splicing tape.

3. Apparatus as claimed in claim 1, wherein a knife having a slanting cutting edge is allocated to each tape to be severed.

4. Apparatus as claimed in claim 1, wherein the splicing station comprises a first stationary holder bar, a second holder bar which can be moved out of the plane in which the stationary holder bar is located, and a third holder bar which is displaceable relative to said stationary holder bar, the holder bars consisting of rectangular members whose upper surfaces are provided with a plurality of parallel grooves, lying next to each other, which are of such a width and arranged in such a way that the tapes can be accommodated therein, the bases of said parallel grooves being provided with openings that are connected to a source of vacuum.

* * * * *